United States Patent
Yamagishi (10) Patent No.: US 8,867,677 B2
(45) Date of Patent: Oct. 21, 2014

(54) DEMODULATION DEVICE

(75) Inventor: Nobutaka Yamagishi, Yokohama (JP)

(73) Assignee: Fujitsu Semiconductor Limited, Yokohama (JP)

( * ) Notice: Subject to any disclaimer, the term of this patent is extended or adjusted under 35 U.S.C. 154(b) by 617 days.

(21) Appl. No.: 13/195,531

(22) Filed: Aug. 1, 2011

(65) Prior Publication Data

US 2012/0099683 A1 Apr. 26, 2012

(30) Foreign Application Priority Data

Oct. 20, 2010 (JP) ................................. 2010-235530

(51) Int. Cl.
*H04B 1/10* (2006.01)
(52) U.S. Cl.
CPC ..................................... *H04B 1/109* (2013.01)
USPC ...................................................... 375/346
(58) Field of Classification Search
CPC .......... H04B 1/10; H04B 1/109; H04L 27/38; H04L 27/3809
USPC .................. 375/261, 285, 332, 346; 455/296; 329/304
See application file for complete search history.

(56) References Cited

U.S. PATENT DOCUMENTS

| | | | | |
|---|---|---|---|---|
| 4,683,578 A | * | 7/1987 | Betts et al. | 375/345 |
| 7,031,399 B2 | * | 4/2006 | Iemura | 375/285 |
| 7,206,279 B2 | | 4/2007 | Taga et al. | |
| 2002/0058487 A1 | | 5/2002 | Takeuchi | |
| 2002/0101940 A1 | * | 8/2002 | Iemura | 375/346 |

FOREIGN PATENT DOCUMENTS

| | | |
|---|---|---|
| JP | 2001-339320 A | 12/2001 |
| JP | 2003-283454 A | 10/2003 |

* cited by examiner

*Primary Examiner* — Betsy Deppe
(74) *Attorney, Agent, or Firm* — Fujitsu Patent Center (57) ABSTRACT

There is provided a demodulation device including: a first noise elimination circuit eliminating a noise in an output signal of IQ coordinates from a demodulation unit demodulating an input signal, in which the first noise elimination circuit includes: a first subtracter subtracting a first noise replica signal from the signal of the IQ coordinates that is output from the demodulation unit; an error information generation unit calculating error information of an output signal of the first subtracter to an ideal signal point of the IQ coordinates; a first frequency detection unit detecting a frequency of the noise based on the error information; and a first amplitude adjusting unit adjusting an amplitude of the first noise replica signal based on the error information and the frequency of the noise detected in the first frequency detection unit to output the first noise replica signal to the first subtracter.

10 Claims, 10 Drawing Sheets

DEMODULATION DEVICE

CROSS-REFERENCE TO RELATED APPLICATION

This application is based upon and claims the benefit of priority of the prior Japanese Patent Application No. 2010-235530, filed on Oct. 20, 2010, the entire contents of which are incorporated herein by reference.

FIELD

The present embodiments relate to a demodulation device.

BACKGROUND

Figure 1:
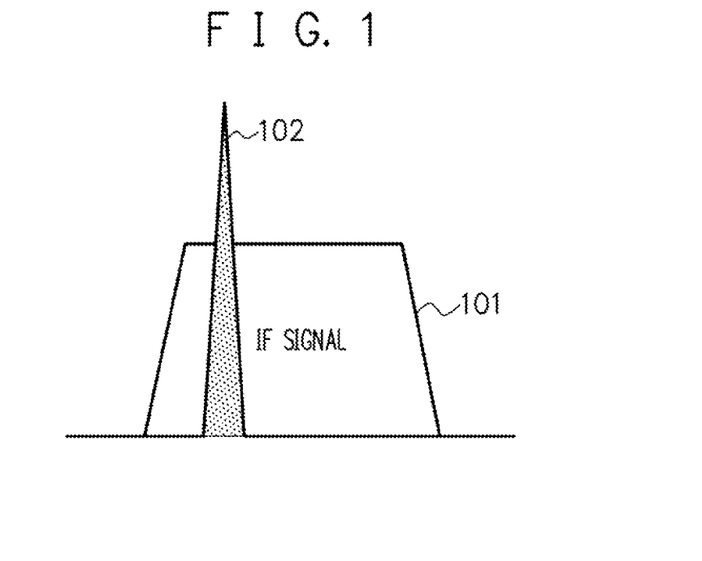
FIG. 1 is a view depicting an example of a frequency spectrum of a broadcast wave signal received in a demodulation circuit in a digital television receiver.

FIG. 1 is a view depicting an example of a frequency spectrum of a broadcast wave signal 101 received in a demodulation circuit in a digital television receiver. The broadcast wave signal 101 is an intermediate frequency (IF) signal, for example. When a noise 102 is mixed in the broadcast wave signal 101, the noise 102 becomes a cause of quality deterioration of the broadcast wave signal 101 due to the same frequency (Co-Channel) interference. The noise 102 is, for example, a noise generated from a peripheral device or a noise of the demodulation circuit itself in the digital television receiver, and is a sinusoidal signal of a single frequency.

There has been known an interference wave elimination circuit including: a phase locking means phase locking a signal to a carrier frequency of an interference wave received with a selected received wave; a level adjusting means adjusting a level of the signal phase locked in the phase locking means; and a subtracting means subtracting the signal whose level is adjusted in the level adjusting means from the received wave, in which the received wave from which the received interference wave is eliminated is output from the subtracting means (see, for example, Patent Document 1).

Further, there has been known an OFDM receiving apparatus having highly accurate reception performance even in the case when the same channel disturbance of an analog TV signal or CW disturbance exists (see, for example, Patent Document 2).

[Patent Document 1] Japanese Laid-open Patent Publication No. 2001-339320

[Patent Document 2] Japanese Laid-open Patent Publication No. 2003-283454

In Patent Document 1, in order to eliminate the interference wave, a loop in a phase locked loop (PLL) circuit is used, and thereby a replica of the interference wave is generated from the input signal and the replica is subtracted from the input signal. However, in the above method, when a level of the interference wave is smaller than that of a desired wave, phase comparison in the PLL circuit is not performed, so that it is impossible to obtain a sufficient effect. Further, in the case when an interference wave that arrives with a time lag due to reflection exists (fading), there is sometimes a case that an irregularity occurs in a frequency spectrum to be erroneously detected as a noise, resulting that performance deteriorates.

SUMMARY

A demodulation device includes: a demodulation unit demodulating an input signal to thereby output a signal of IQ coordinates; and a first noise elimination circuit eliminating a noise in the signal of the IQ coordinates that is output from the demodulation unit, in which the first noise elimination circuit includes: a first subtracter subtracting a first noise replica signal from the signal of the IQ coordinates that is output from the demodulation unit; an error information generation unit calculating error information of an output signal of the first subtracter to an ideal signal point of the IQ coordinates; a first frequency detection unit detecting a frequency of the noise based on the error information; and a first amplitude adjusting unit adjusting an amplitude of the first noise replica signal based on the error information and the frequency of the noise detected in the first frequency detection unit to output the first noise replica signal to the first subtracter.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS (First Embodiment)

Figure 2:
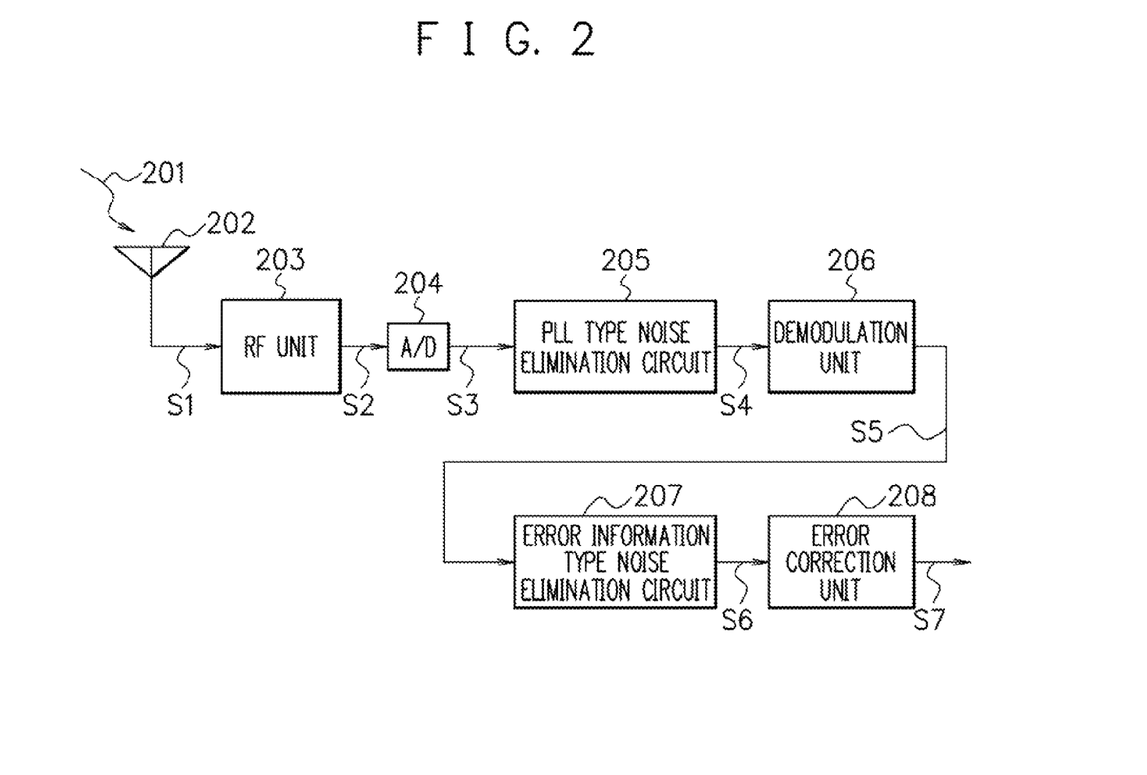
FIG. 2 is a block diagram depicting a configuration example of a demodulation device according to a first embodiment.
Figure 3:
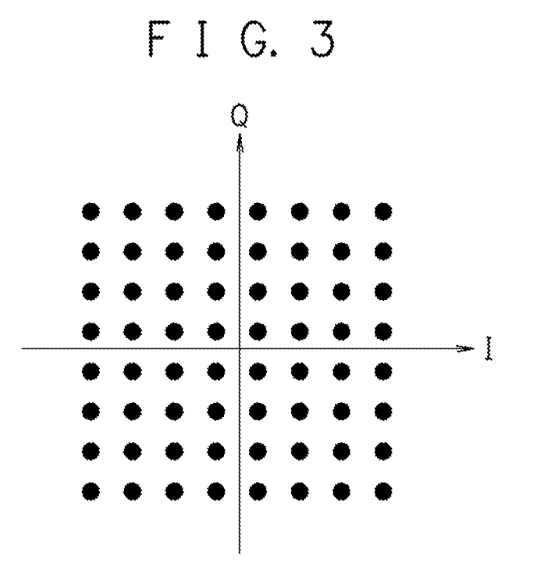
FIG. 3 is a view depicting an example of a constellation of an output signal of a demodulation unit.

FIG. 2 is a block diagram depicting a configuration example of a demodulation device according to a first embodiment. The demodulation device is, for example, a demodulation device of a single-carrier transmission digital television receiver. An antenna 202 receives a radio broadcast wave signal 201 to output a received signal S1 to a high frequency (RF) unit 203. The RF unit 203 down-converts the received signal from a high frequency band to a low frequency band to output a signal S2 in the low frequency band to an analog and digital converter 204. The analog and digital converter 204 converts the signal S2 to a digital signal from an analog signal to output a digital signal S3. The signal S3 is, for example, a baseband signal or an intermediate frequency (IF) signal, and is a broadcast wave signal 101 including a noise 102 as depicted in FIG. 1. A second noise elimination circuit 205 is a phase locked loop (PLL) type noise elimination circuit positioned at the preceding stage of a demodulation unit 206, and eliminates the noise in the signal S3 to output a signal S4 from which the noise is eliminated to the demodulation unit 206. The demodulation unit 206 demodulates the signal S4 to output a signal S5 of IQ coordinates of an I axis and a Q axis that intersect perpendicularly as depicted in FIG. 3. The signal S5 is a signal of signal points called a constellation on the I axis and the Q axis. A first noise elimination circuit 207 is an error information type noise elimination circuit positioned at the subsequent stage of the demodulation unit 206, and eliminates a noise in the signal S5 to output a signal S6 from which the noise is eliminated. An error correction unit 208 performs error correction processing on the signal S6 to output a signal S7. The signal S7 is a transport stream (TS) signal, for example.

FIG. 3 is a view depicting an example of the constellation of the output signal S5 of the demodulation unit 206, where an example of 64 QAM is depicted. In the case of 64 QAM, the signal S5 is a 6-bit signal, and can express 64 signal points on the I axis and the Q axis. The first noise elimination circuit 207 detects error information from the constellation of the signal S5 to eliminate the noise by using an error from an ideal signal point. Details thereof are described later.

The second noise elimination circuit 205 and the first noise elimination circuit 207 operate cooperatively according to a level of the noise 102, and thereby it is possible to eliminate the noises 102 in a wide range of levels and prevent performance deterioration in the case when fading exists.

Figure 4:
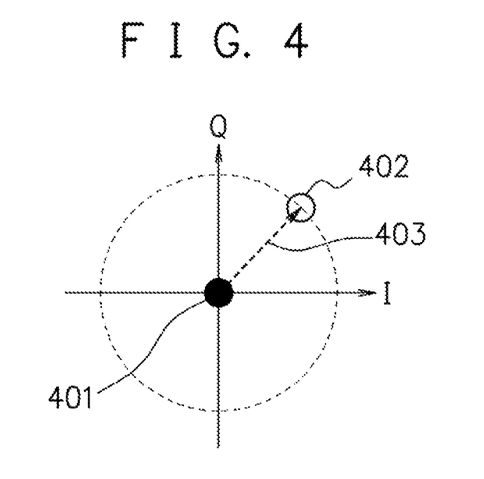
FIG. 4 is a view depicting a constellation of a signal including a noise.

FIG. 4 is a view depicting a constellation of the signal S5 including the noise 102. An ideal signal point 401 of the IQ coordinates is one of the 64 signal points in FIG. 3 where the noise 102 does not exist. An actual signal point 402 is a signal point in the case where the noise 102 exists. Error information 403 is deviation information of the actual signal point 402 from the ideal signal point 401. In the case when the noise 102 is a sine wave of a frequency θ, the actual signal point 402 rotates counterclockwise about the ideal signal point 401 at the frequency θ. The first noise elimination circuit 207 uses the error information 403 being a difference between the ideal signal point 401 and the actual signal point 402, thus being able to accurately eliminate even the noise 102 of the small level.

Figure 5:
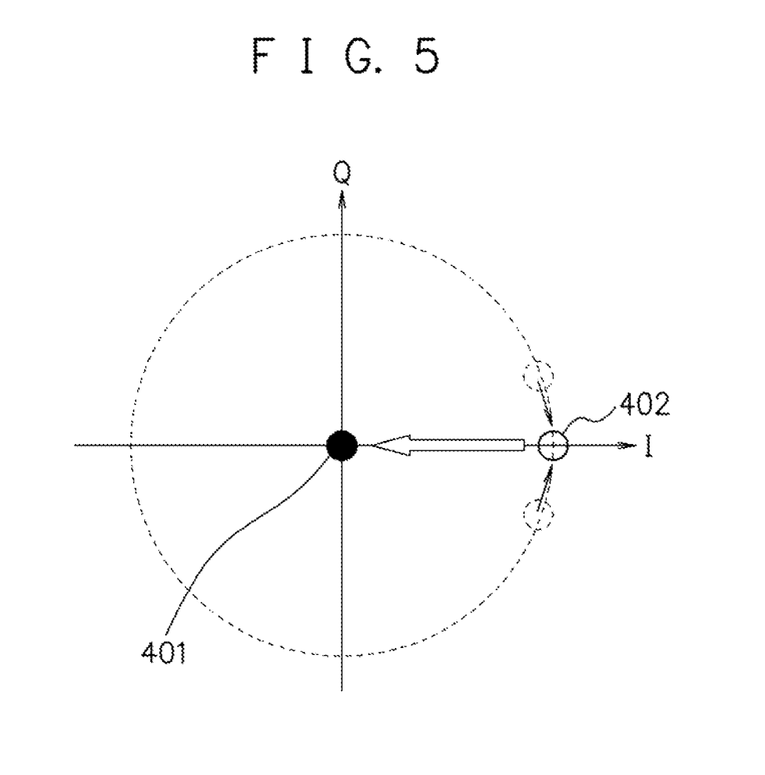
FIG. 5 is a view of the constellation for explaining a concept to make an actual signal point approach an ideal signal point, thereby eliminating the noise in the signal.

FIG. 5 is a view of the constellation for explaining a concept to make the actual signal point 402 approach the ideal signal point 401, thereby eliminating the noise 102 in the signal S5. As described above, the actual signal point 402 rotates counterclockwise about the ideal signal point 401 at the frequency θ. First, a first frequency detection unit 603 in FIG. 6 detects the frequency θ of the error information 403 to fix the actual signal point 402 on the I axis. Next, a first amplitude adjusting unit 608 in FIG. 6 makes an amplitude of the error information 403 approach zero, thereby making the actual signal point 402 approach the ideal signal point 401. The first noise elimination circuit 207 makes the error information 403 in FIG. 4 approach zero, thereby making the actual signal point 402 approach the ideal signal point 401 to eliminate the noise 102.

In the case when the noise 102 exists in single carrier transmission for satellite or cable television, the actual signal point 402 shows a movement such that it rotates about the ideal signal point 401. Besides the second noise elimination circuit 205, the first noise elimination circuit 207 in which the error information 403 between the actual signal point 402 and the ideal signal point 401 is used is added to this embodiment, and thereby the noise 102 can be eliminated accurately even in the case when the level of the noise 102 is small.

Figure 6:
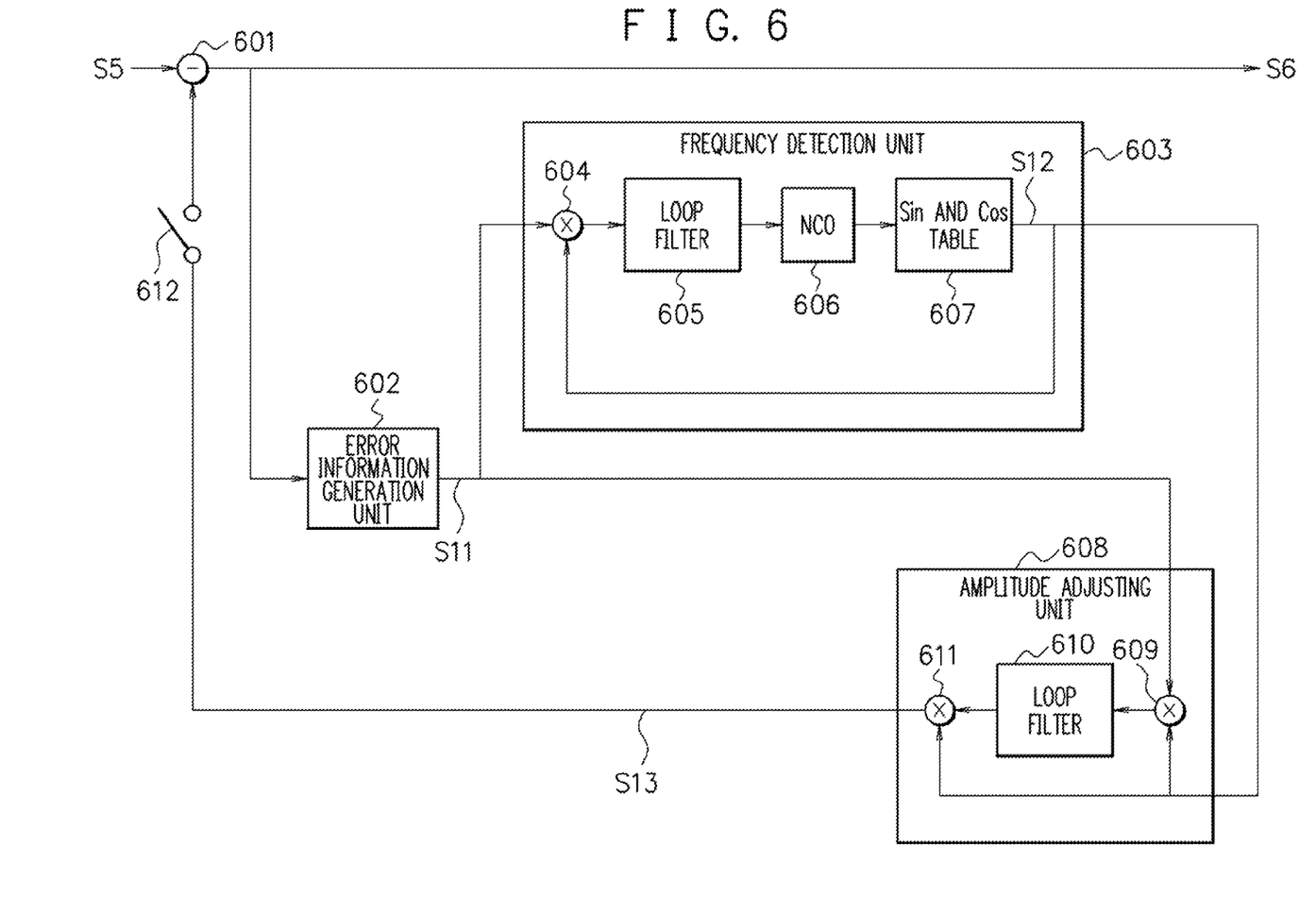
FIG. 6 is a view depicting a configuration example of a first noise elimination circuit.

FIG. 6 is a view depicting a configuration example of the first noise elimination circuit 207. The first noise elimination circuit 207 has a first subtracter 601, an error information generation unit 602, the first frequency detection unit 603, the first amplitude adjusting unit 608, and a switch 612. First, the operation in the case when the switch 612 is always turned on is explained. The first subtracter 601 subtracts a first noise replica signal S13 from the input signal S5 to output the signal S6 from which the noise is eliminated. The first noise replica signal S13 is generated by loop processing, so that the noise in the signal S6 gradually approaches zero. The error information generation unit 602 calculates the error information 403 of the signal S6 to the ideal signal point 401 to output the result as error information S11. The error information S11 is an IQ coordinate value.

The first frequency detection unit 603 has a multiplier 604, a loop filter 605, a numerical controlled oscillator (Numerical Controlled Oscillator: NCO) 606, and a sine and cosine table 607, and detects the frequency θ of the error information S11 to output a sinusoidal signal S12 of the frequency θ. Details thereof are explained later with reference to FIG. 7.

The first amplitude adjusting unit 608 has multipliers 609, 611 and a loop filter 610, and adjusts an amplitude of the sinusoidal signal S12 of the frequency θ based on the error information S11 to generate the first noise replica signal S13. That is, the first amplitude adjusting unit 608 adjusts an amplitude of the first noise replica signal S13 based on the error information S11 and the sinusoidal signal S12. Details thereof are explained later with reference to FIG. 8.

The first noise elimination circuit 207 has the first frequency detection unit 603 detecting the frequency and phase of the noise and the first amplitude adjusting unit 608 detecting an amplitude of the noise. Further, the first noise elimination circuit 207 has a first loop circuit in which the signal S12 is fed back to the multiplier 604 and a second loop circuit in which the signal S13 is fed back to the first subtracter 601. The first and second loop circuits converge such that the error information S11 becomes zero. It is possible that the first subtracter 601 subtracts the first noise replica signal S13 from the input signal S5 to thereby output the signal S6 from which the noise is eliminated.

Figure 7:
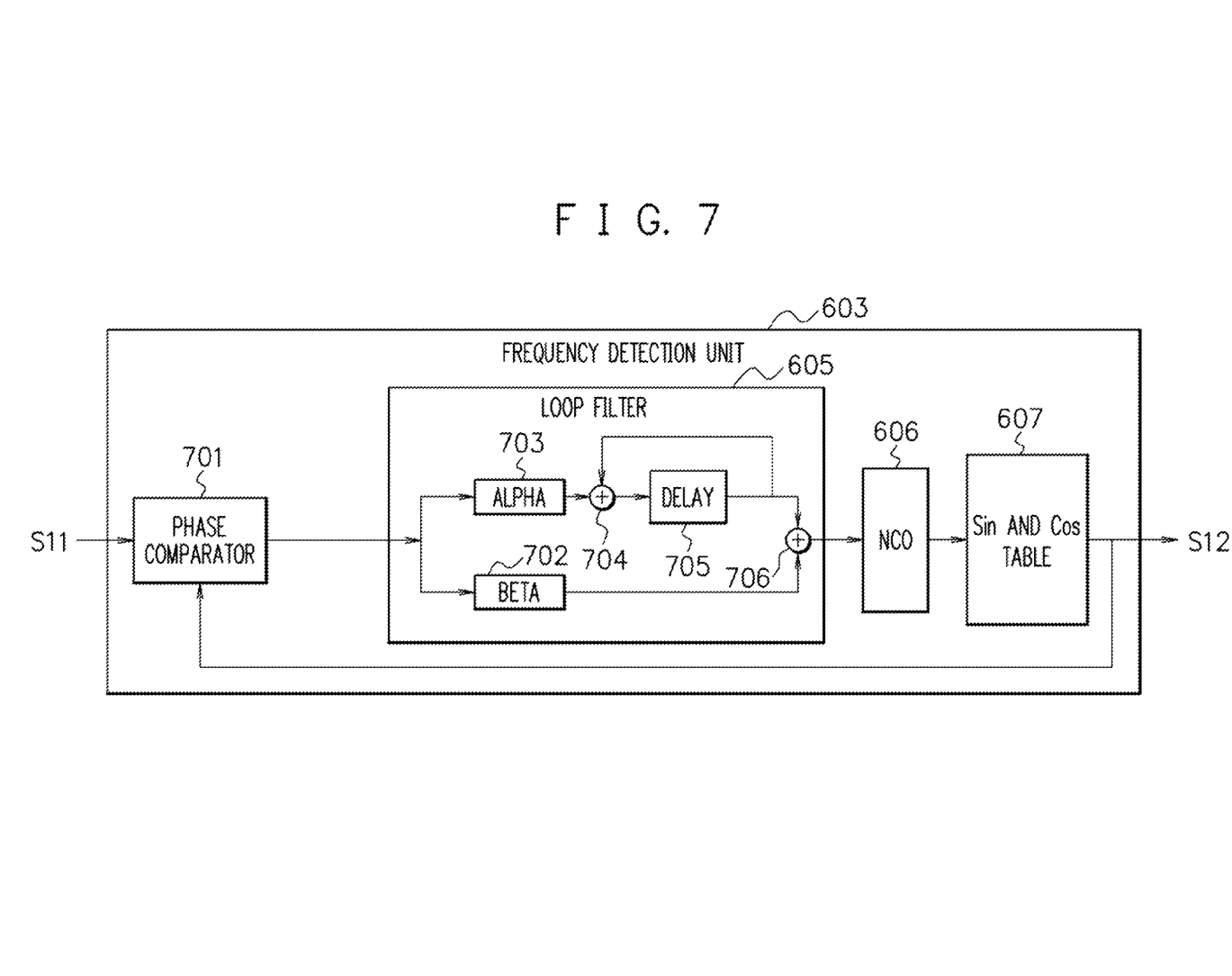
FIG. 7 is a view depicting a more detailed configuration example of a first frequency detection unit.

FIG. 7 is a view depicting a more detailed configuration example of the first frequency detection unit 603. The first frequency detection unit 603 has a phase comparator 701, the loop filter 605, the numerical controlled oscillator 606, and the sine and cosine table 607. The phase comparator 701 corresponds to the multiplier 604 in FIG. 6. The loop filter 605 has multipliers 702, 703, adders 704, 706, and a delay circuit 705.

The phase comparator 701 multiplies the error information S11 by the sinusoidal signal S12 output from the sine and cosine table 607 in opposite phase to output a Q component of the result. The multiplier 703 multiplies an output signal of the phase comparator 701 by a coefficient α. The adder 704 adds an output signal of the multiplier 703 and an output signal of the delay circuit 705. The delay circuit 705 delays an output signal of the adder 704. The multiplier 702 multiplies the output signal of the phase comparator 701 by a coefficient β. The adder 706 adds the output signal of the delay circuit 705 and an output signal of the multiplier 702. The numerical controlled oscillator 606 periodically outputs phase data of 0 to 2 π [rad] in a cycle corresponding to an input signal. The sine and cosine table 607 receives the phase data to output the sinusoidal signal S12.

In the case when the phase of the error information S11 advances more than that of the sinusoidal signal S12, the output signal of the phase comparator 701 becomes a positive value, and a larger value is input to the numerical controlled oscillator 606, and the phase of the sinusoidal signal S12 output from the sine and cosine table 607 advances, resulting that a difference in phase between the error information S11 and the sinusoidal signal S12 approaches zero. On the other hand, in the case when the phase of the error information S11 is delayed more than that of the sinusoidal signal S12, the output signal of the phase comparator 701 becomes a negative value, and a smaller value is input to the numerical controlled oscillator 606, and the phase of the sinusoidal signal S12 output from the sine and cosine table 607 is delayed, resulting that the difference in phase between the error information S11 and the sinusoidal signal S12 approaches zero. The first loop circuit of the first frequency detection unit 603 converges, and thereby the sinusoidal signal S12 output from the sine and cosine table 607 converges to the same frequency and phase as those of the error information S11.

As long as the first loop circuit of the first frequency detection unit 603 converges, as described above, the error information S11 and the sinusoidal signal S12 agree with each other in frequency and phase. When the error information S11 and the sinusoidal signal S12 are multiplied in opposite phase, the Q component signal output from the phase comparator 701 converges to zero. That is, the error information S11 converges on the I axis.

Figure 8:
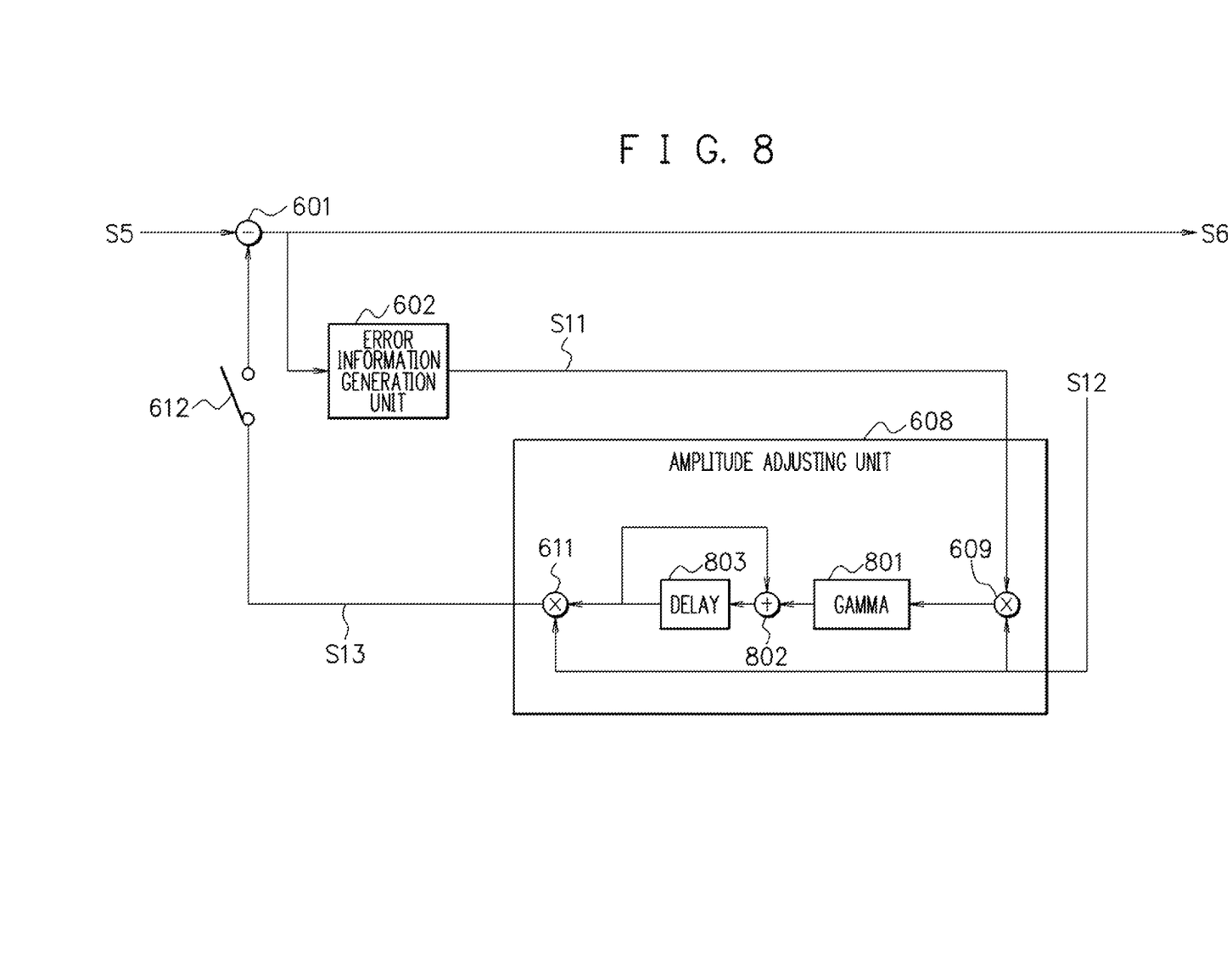
FIG. 8 is a view depicting a more detailed configuration example of a first amplitude adjusting unit.

FIG. 8 is a view depicting a more detailed configuration example of the first amplitude adjusting unit 608. The first amplitude adjusting unit 608 has the multipliers 609, 611, a multiplier 801, an adder 802, and a delay circuit 803. The multiplier 801, the adder 802, and the delay circuit 803 correspond to the loop filter 610 in FIG. 6. The multiplier 609 multiplies the error information S11 and the sinusoidal signal S12 to output a signal only with an I component. The multiplier 801 multiplies the output signal of the multiplier 609 by a coefficient γ. The adder 802 adds an output signal of the multiplier 801 and an output signal of the delay circuit 803. The delay circuit 803 delays an output signal of the adder 802. The multiplier 611 multiplies the output signal of the delay circuit 803 and the sinusoidal signal S12 to output the first noise replica signal S13 obtained after the noise is replicated. The first subtracter 601 subtracts the first noise replica signal S13 from the input signal S5 to thereby output the signal S6 from which the noise is eliminated.

The existence of the noise means that the error information 403 depicted in FIG. 4 exists, so that the I component signal output from the multiplier 609 is not zero. Every time the loop of the signal S13 in the second loop circuit is repeated, a value of the I component signal output from the multiplier 609 is accumulated in the loop filter 610 of the first amplitude adjusting unit 608, and the amplitude of the first noise replica signal S13 is gradually increased. This means that the noise is eliminated little by little, so that the error information S11 is reduced and the I component signal output from the multiplier 609 also converges to zero gradually.

As described above, the loops of the first frequency detection unit 603 and the first amplitude adjusting unit 608 (first and second loop circuits) converge, and thereby the output signal S12 of the first frequency detection unit 603 becomes equal to the error information S11 in frequency and phase and the output signal S13 of the first amplitude adjusting unit 608 becomes equal to the error information S11 in amplitude, resulting that the error information S11 approaches zero. That is, the first noise replica signal S13 is output from the first amplitude adjusting unit 608 and the signal S6 becomes the signal from which the noise is eliminated.

Figure 9:
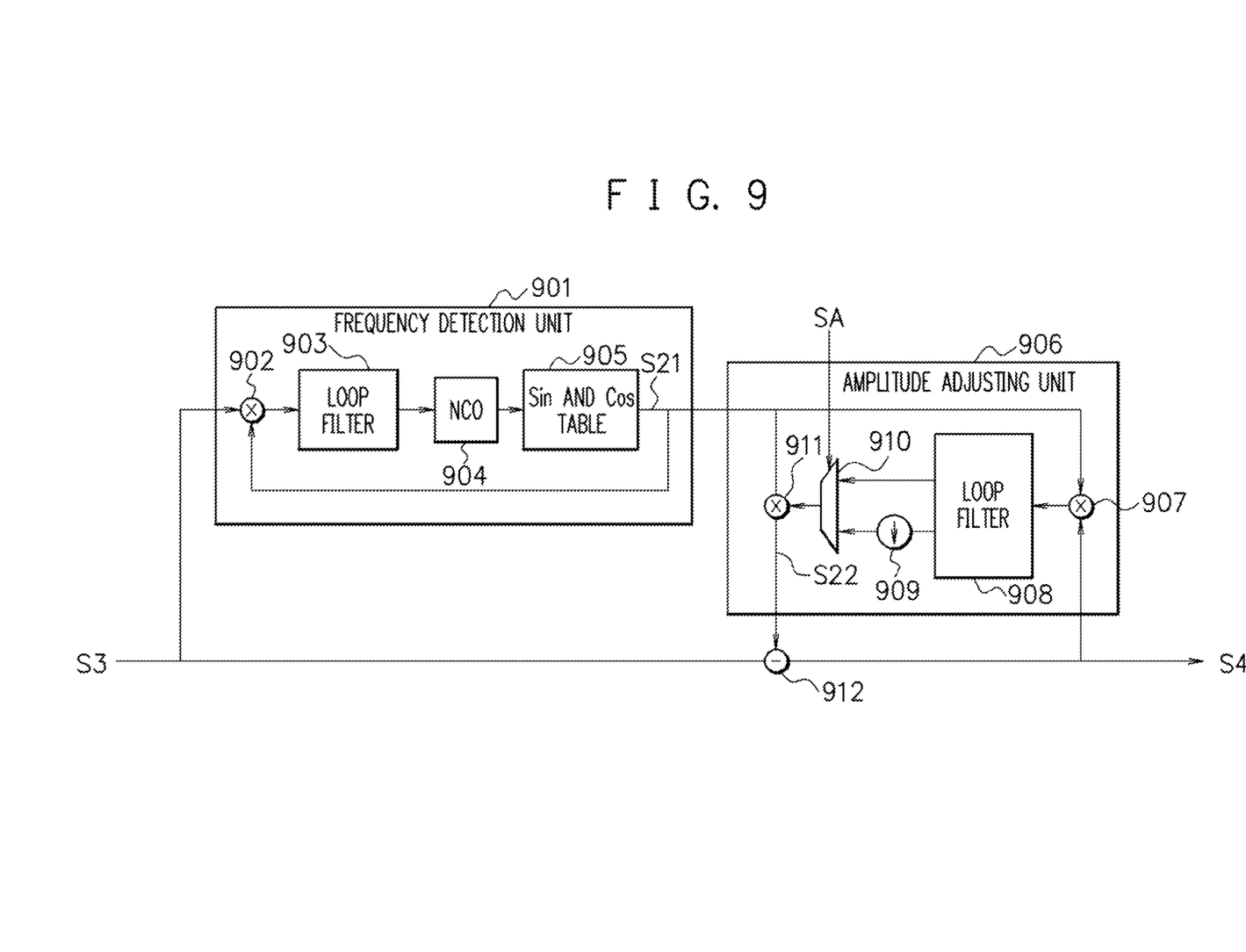
FIG. 9 is a view depicting a configuration example of a second noise elimination circuit.

FIG. 9 is a view depicting a configuration example of the second noise elimination circuit 205. The second noise elimination circuit 205 has a second frequency detection unit 901, a second amplitude adjusting unit 906, and a second subtracter 912. The second frequency detection unit 901, similarly to the first frequency detection unit 603 in FIG. 6, has a multiplier (phase comparator) 902, a loop filter 903, a numerical controlled oscillator 904, and a sine and cosine table 905, and detects a frequency of the noise in the input signal S3 to output a sinusoidal signal S21 of the detected frequency. The sinusoidal signal S21 has a deviation frequency of the frequency of the noise from the center frequency of the signal S3.

The second amplitude adjusting unit 906 has a multiplier 907, a loop filter 908, a gain adjusting unit 909, a selector 910, and a multiplier 911, and adjusts an amplitude of a second noise replica signal S22 based on the output signal S4 of the second subtracter 912 and the sinusoidal signal S21. The multiplier 907, the loop filter 908, the multiplier 911, and the second subtracter 912 correspond to the multiplier 609, the loop filter 610, the multiplier 611, and the first subtracter 601 in FIG. 6 respectively. The multiplier 911 outputs the second noise replica signal S22 obtained after the noise is replicated. The second subtracter 912 subtracts the second noise replica signal S22 from the input signal S3 to thereby output the signal S4 from which the noise is eliminated. Similarly to the first noise elimination circuit 207, the second noise elimination circuit 205 has the noise in the signal S4 reduced gradually by loop processing. When the noise in the signal S4 becomes smaller than a threshold value, the demodulation unit 206 in FIG. 2 has demodulation processing concluded to be locked and completes pulling in, and outputs pull-in completion notification SA to perform normal demodulation. The selector 910 selects an output signal of the loop filter 908 to output it to the multiplier 911 until it receives the pull-in completion notification SA from the demodulation unit 206, and selects an output signal of the gain adjusting unit 909 to output it to the multiplier 911 upon receiving the pull-in completion notification SA from the demodulation unit 206. That is, in an initial state, the pull-in completion notification SA is not output, and the noise in the signal S4 is reduced and soon the pull-in completion notification SA is output.

First, the case where the selector 910 selects the output signal of the loop filter 908 in the initial state is explained. In the above case, similarly to the first amplitude adjusting unit 608 in the first noise elimination circuit 207, the second amplitude adjusting unit 906 detects an amplitude of the noise to adjust the amplitude of the second noise replica signal S22. The multiplier 907 multiplies the sinusoidal signal S21 and the signal S4 to output a signal indicating a correlation value between the sinusoidal signal S21 and the signal S4. The loop filter 908 receives the output signal of the multiplier 907 to accumulate the above-described correlation value therein similarly to the loop filter 610 in FIG. 6. The selector 910 selects the output signal of the loop filter 908 to output it to the multiplier 911 because the pull-in completion notification SA is not output. The multiplier 911 multiplies the sinusoidal signal S21 and the output signal of the loop filter 908 to output the second noise replica signal S22. The second subtracter 912 subtracts the second noise replica signal S22 from the input signal S3 to thereby output the signal S4 from which the noise is eliminated.

When the noise in the signal S4 is then reduced, the demodulation unit 206 is locked to output the pull-in completion notification SA. When the pull-in completion notification SA is input to the selector 910, the gain adjusting unit 909 gradually reduces a level of the output signal of the loop filter 908 to zero. When receiving the pull-in completion notification SA, the selector 910 selects the output signal of the gain adjusting unit 909. The multiplier 911 multiplies the sinusoidal signal S21 and the output signal of the gain adjusting unit 909 to output the second noise replica signal S22. That is, the gain adjusting unit 909 performs control to gradually change a level of the second noise replica signal S22 to zero when the selector 910 receives the pull-in completion notification SA. The second subtracter 912 subtracts the second noise replica signal S22 from the input signal S3 to output the signal S4 from which the noise is eliminated. When the level of the second noise replica signal S22 becomes zero, the signal S4 becomes the same signal as the input signal S3, and thereby a noise elimination function of the second noise elimination circuit 205 is turned off. A malfunction of the second noise elimination circuit 205 due to fading can be prevented by the gain adjusting unit 909.

Figure 10:
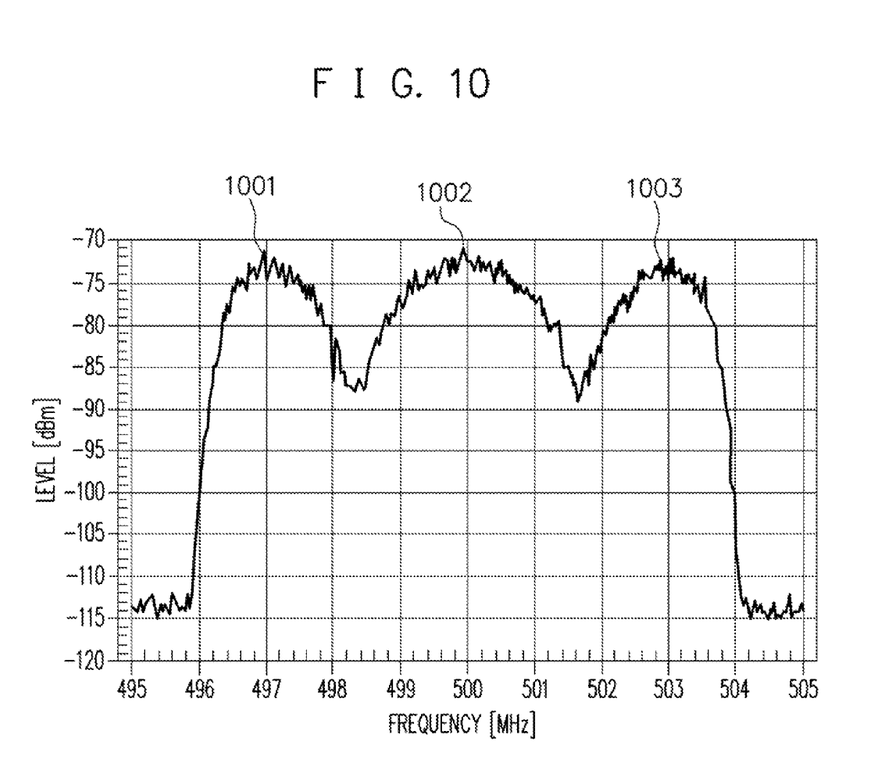
FIG. 10 is a view depicting an example of a frequency spectrum in the case when an interference wave due to fading is mixed in an input signal.

FIG. 10 is a view depicting an example of a frequency spectrum in the case when an interference wave due to fading is mixed in an input signal. Fading is a phenomenon in which by an effect of reflection of buildings standing between a transmission point and a reception point, or the like, a radio wave propagates from the transmission point to the reception point through a plurality pf paths. When an interference wave is generated by fading, notches 1001 to 1003 are applied to the signal. When such a spectrum is input, the second noise elimination circuit 205 detects the noise erroneously, resulting that a demodulation characteristic deteriorates in some cases.

In this embodiment, in order to prevent the erroneous detection due to fading, the gain adjusting unit 909 is provided to be operated cooperatively with the first noise elimination circuit 207, and thereby it is possible to prevent the malfunction of the second noise elimination circuit 205 and prevent the deterioration of the demodulation characteristic due to fading.

As described previously, the first noise elimination circuit 207 eliminates the noise based on the error information S11, thus being able to accurately eliminate even all types of noises as long as the demodulation unit 206 is locked and the first noise elimination circuit 207 obtains the error information S11. Thus, in the case of the demodulation unit 206 being locked, even though the second noise elimination circuit 205 stops the operation, the performance of the whole demodulation device is not affected, and there is rather an advantage that the erroneous detection at the time of fading as described above can be prevented.

As described above, the selector 910 selects the output signal of the loop filter 908 until it receives the pull-in completion notification SA of the demodulation unit 206, and selects the output signal of the gain adjusting unit 909 upon receiving the pull-in completion notification SA. The gain adjusting unit 909 gradually reduces a value of a gain by which an output value of the loop filter 908 is multiplied, and finally makes the level of the second noise replica signal S22 zero, and the second noise elimination circuit 205 is bypassed. When the second noise elimination circuit 205 is bypassed suddenly, there is sometimes a case that a synchronization system of the whole demodulation device is adversely affected. However, gradually reducing the level of the second noise replica signal S22 by the gain adjusting unit 909 makes the second noise elimination circuit 205 possible to be brought into a bypass state while a synchronous loop characteristic of the whole demodulation device is maintained.

The second noise elimination circuit 205 has difficulty in eliminating the noise 102 effectively because the correlation value is not obtained in the case of the level of the noise 102 being small. The first noise elimination circuit 207 is provided in order to solve the above problem. The first noise elimination circuit 207 eliminates the noise of the small level by using the error information S11 of the signal S5 output from the demodulation unit 206.

The first noise elimination circuit 207 has the first frequency detection unit 603 and the first amplitude adjusting unit 608 similarly to the second noise elimination circuit 205. However, the first noise elimination circuit 207 differs from the second noise elimination circuit 205 in using the error information S11 as the input signal.

The second noise elimination circuit 205 and the first noise elimination circuit 207 can eliminate the noise in a manner to operate both the frequency detection units 603 and 901 and both the amplitude adjusting units 608 and 906 to thereby generate the noise replica signals S13, S22 and subtract the noise replica signals S13, S22 from the input signals S5, S3.

In the case of the level of the noise being large, the accuracy of the phase comparator (multiplier) 902 increases, so that the second noise elimination circuit 205 can eliminate the noise, but in the case of the level of the noise being small, correlation calculation in the phase comparator (multiplier) 902 is not possible to be performed, so that the second noise elimination circuit 205 has difficulty in detecting the noise. On the other hand, in the case of the level of the noise being large, the whole demodulation device is not allowed to be locked before the first noise elimination circuit 207 obtains the error information S11, and it is also impossible for the first noise elimination circuit 207 to start the operation. Conversely, in the case of the level of the noise being small, it is possible to accurately eliminate the noise by using the error information S11. The second noise elimination circuit 205 and the first noise elimination circuit 207 are connected in series, thereby enabling the noises in a wide range of levels to be eliminated.

(Second Embodiment)

Figure 11:
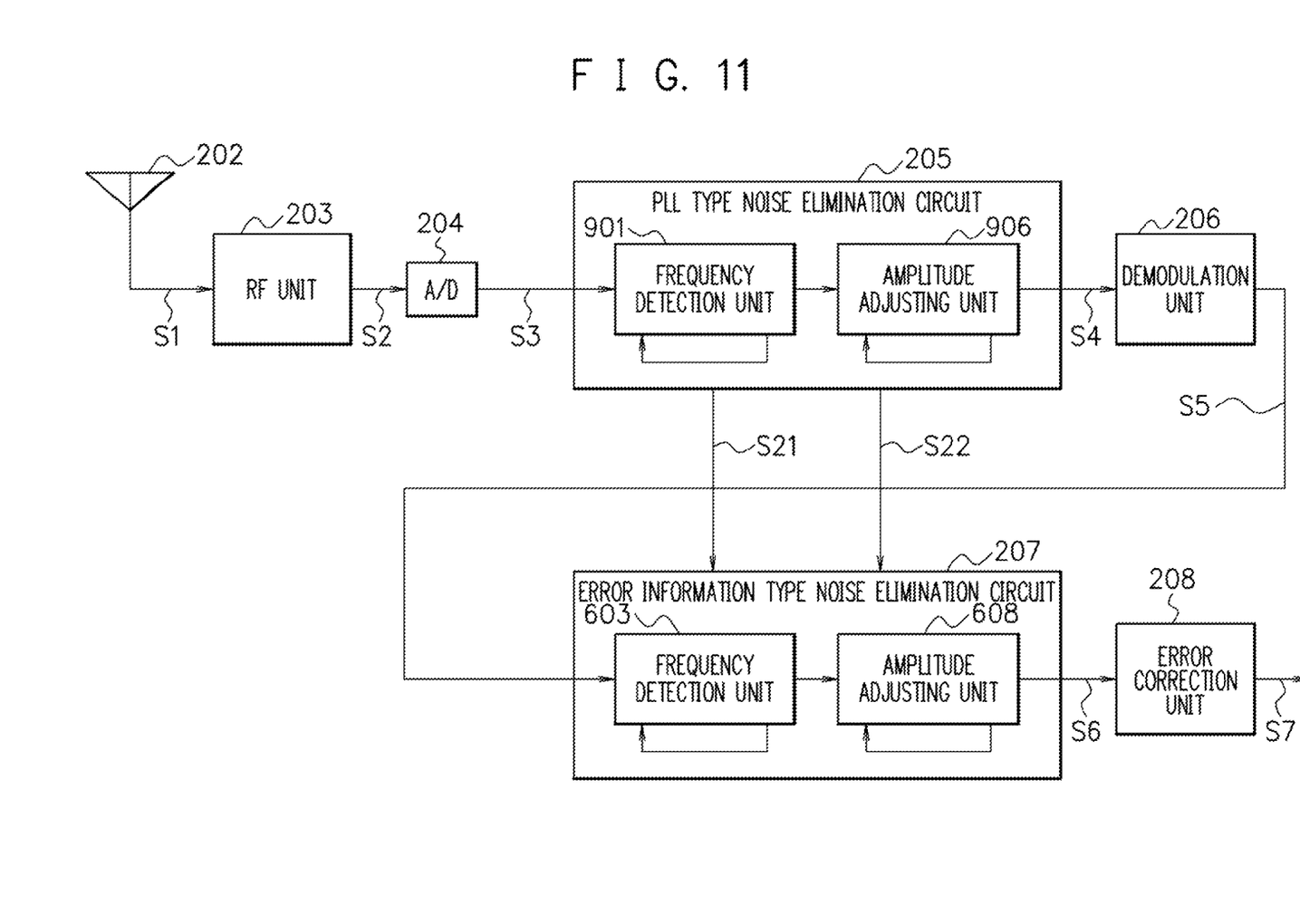
FIG. 11 is a view depicting a configuration example of a demodulation device according to a second embodiment.

FIG. 11 is a view depicting a configuration example of a demodulation device according to a second embodiment. Hereinafter, differences of this embodiment from the first embodiment are explained. The second noise elimination circuit 205 outputs the detected sinusoidal signal S21 and second noise replica signal S22 in FIG. 9 to the first noise elimination circuit 207. The sinusoidal signal S21 is frequency information of the noise, and the second noise replica signal S22 is level information of the noise. The first noise elimination circuit 207 receives the sinusoidal signal S21 and the second noise replica signal S22 to eliminate the noise. This makes the second noise elimination circuit 205 and the first noise elimination circuit 207 possible to operate cooperatively.

As explained in the first embodiment, the second noise elimination circuit 205 in FIG. 9 turns the noise elimination function off when the selector 910 receives the pull-in completion notification SA to select the output signal of the gain adjusting unit 909. In the case when the level of the noise is large and the frequency of the noise varies on this occasion, there is a possibility that only the operation of the first noise elimination circuit 207 alone is not allowed to follow the noise elimination. In order to solve the above problem, the second noise elimination circuit 205 transmits the sinusoidal signal (frequency information of the noise) S21 to the first noise elimination circuit 207 even after turning the noise elimination function off.

The first noise elimination circuit 207 receives the sinusoidal signal (frequency information of the noise) S21 and the second noise replica signal (level information of the noise) S22 from the second noise elimination circuit 205. Further, the first noise elimination circuit 207 always monitors the second noise replica signal (level information of the noise) S22 to confirm the level of the noise. The demodulation unit 206 outputs the pull-in completion notification SA, and then the first frequency detection unit 603 in the first noise elimination circuit 207 detects the frequency of the noise according to the sinusoidal signal (frequency information of the noise) S21 when the level of the second noise replica signal S22 is larger than a threshold value. Further, the first noise elimination circuit 207 eliminates the noise without using the sinusoidal signal (frequency information of the noise) S21 when the level of the second noise replica signal S22 is smaller than the threshold value in order to prevent the malfunction of the second noise elimination circuit 205 explained in the first embodiment.

Next, another control method of the second noise elimination circuit 205 and the first noise elimination circuit 207 is explained. The selector 910 in the second noise elimination circuit 205 in FIG. 9 receives the pull-in completion notification SA, and then performs the selection described below. In the second noise elimination circuit 205 in FIG. 9, after receiving the pull-in completion notification SA, the selector 910 determines that the noise adversely affecting the performance does not exist in the case when a convergence value of the output value of the loop filter 908 is smaller than a second threshold value, and selects the output signal of the gain adjusting unit 909, and the noise elimination function is turned off. Similarly, after the selector 910 receives the pull-in completion notification SA from the demodulation unit 206, the first noise elimination circuit 207 in FIG. 6 determines that the noise adversely affecting the performance does not exist in the case when a convergence value of an output value of the loop filter 610 is smaller than a first threshold value, and turns the switch 612 off to turn a noise elimination function off. In the above case, the first subtracter 601 outputs the input signal S5 as it is as the output signal S6. This makes it possible to prevent malfunctions of the second noise elimination circuit 205 and the first noise elimination circuit 207 due to white noise or the like.

Further, in the second noise elimination circuit 205, the selector 910 receives the pull-in completion notification SA and then determines that the noise of the small level exists in the case when the convergence value of the output value of the loop filter 908 is larger than the second threshold value and smaller than a fourth threshold value, and selects the output signal of the gain adjusting unit 909, and the noise elimination function is turned off. The fourth threshold value is a value larger than the second threshold value. Similarly, after the selector 910 receives the pull-in completion notification SA from the demodulation unit 206, the first noise elimination circuit 207 in FIG. 6 determines that the noise of the small level exists in the case when the convergence value of the output value of the loop filter 610 is larger than the first threshold value and smaller than a third threshold value, and turns the switch 612 on to turn the noise elimination function on. The third threshold value is a value larger than the first threshold value.

Further, in the second noise elimination circuit 205, the selector 910 receives the pull-in completion notification SA and then determines that the noise of the large level exists in the case when the convergence value of the output value of the loop filter 908 is larger than the fourth threshold value, and selects the output signal of the loop filter 908, and the noise elimination function is turned on. Similarly, after the selector 910 receives the pull-in completion notification SA from the demodulation unit 206, the first noise elimination circuit 207 in FIG. 6 determines that the noise of the large level exists in the case when the convergence value of the output value of the loop filter 610 is larger than the third threshold value, and turns the switch 612 on to turn the noise elimination function on.

(Third Embodiment)

Figure 12:
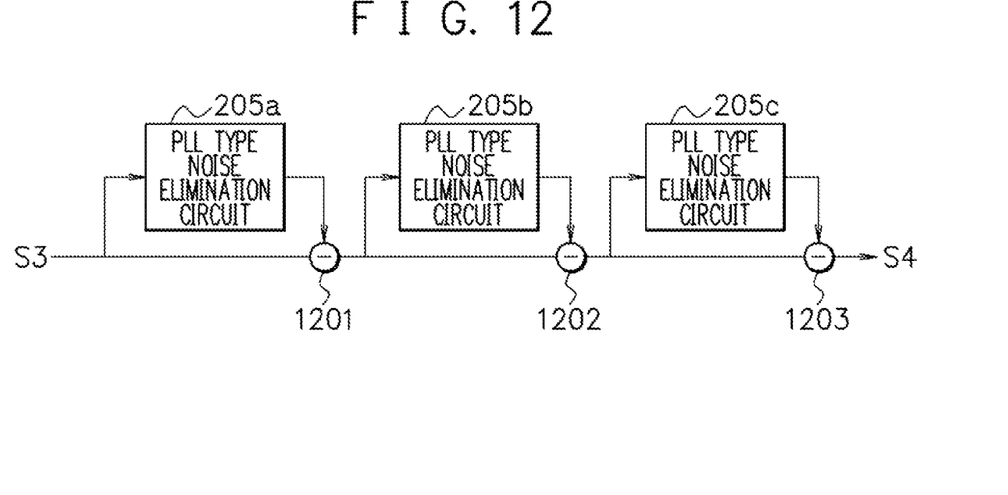
FIG. 12 is a view depicting a partial configuration example of a demodulation device according to a third embodiment.

FIG. 12 is a view depicting a partial configuration example of a demodulation device according to a third embodiment. The demodulation device in this embodiment is one in which noise elimination circuits 205a to 205c and subtracters 1201 to 1203 are provided in the demodulation device in FIG. 2 in place of the second noise elimination circuit 205. The noise elimination circuits 205a to 205c each have the same configuration as that of the second noise elimination circuit 205 from which the second subtracter 912 in FIG. 9 is eliminated. The subtracters 1201 to 1203 correspond to the second subtracter 912 in FIG. 9. That is, in this embodiment, the plurality of second noise elimination circuits 205a to 205c are connected in series at the preceding stage of the demodulation unit 206. Hereinafter, differences of this embodiment from the first embodiment are explained. In this embodiment, in the case when the three noises 102 different in frequency exist in the broadcast wave signal 101 in FIG. 1, the three noises 102 can be eliminated. It is possible to change the number of series connections of the second noise elimination circuits 205a to 205c.

The signal S3 is the signal output from the analog and digital converter 204 in FIG. 2. The noise elimination circuit 205a, similarly to the second noise elimination circuit 205, receives the signal S3 to generate a noise replica signal. The subtracter 1201 subtracts the noise replica signal in the noise elimination circuit 205a from the signal S3 to output a signal from which the first noise is eliminated. The subtracter 1201 corresponds to the second subtracter 912 in FIG. 9.

The noise elimination circuit 205b, similarly to the second noise elimination circuit 205, receives the output signal of the subtracter 1201 to generate a noise replica signal. The subtracter 1202 subtracts the noise replica signal in the noise elimination circuit 205b from the output signal of the subtracter 1201 to output a signal from which the second noise is eliminated. The subtracter 1202 corresponds to the second subtracter 912 in FIG. 9.

The noise elimination circuit 205c, similarly to the second noise elimination circuit 205, receives the output signal of the subtracter 1202 to generate a noise replica signal. The subtracter 1203 subtracts the noise replica signal in the noise elimination circuit 205c from the output signal of the subtracter 1202 to output the signal S4 from which the third noise is eliminated. The subtracter 1203 corresponds to the second subtracter 912 in FIG. 9. The signal S4 is output to the demodulation unit 206 in FIG. 2. Thereby, the three noises different in frequency can be eliminated.

As above, in the case when the three noise elimination circuits 205a to 205c are connected in series, it is possible that the noise elimination circuits 205a to 205c each detect one of the plurality of input noises to eliminate it sequentially.

(Fourth Embodiment)

Figure 13:
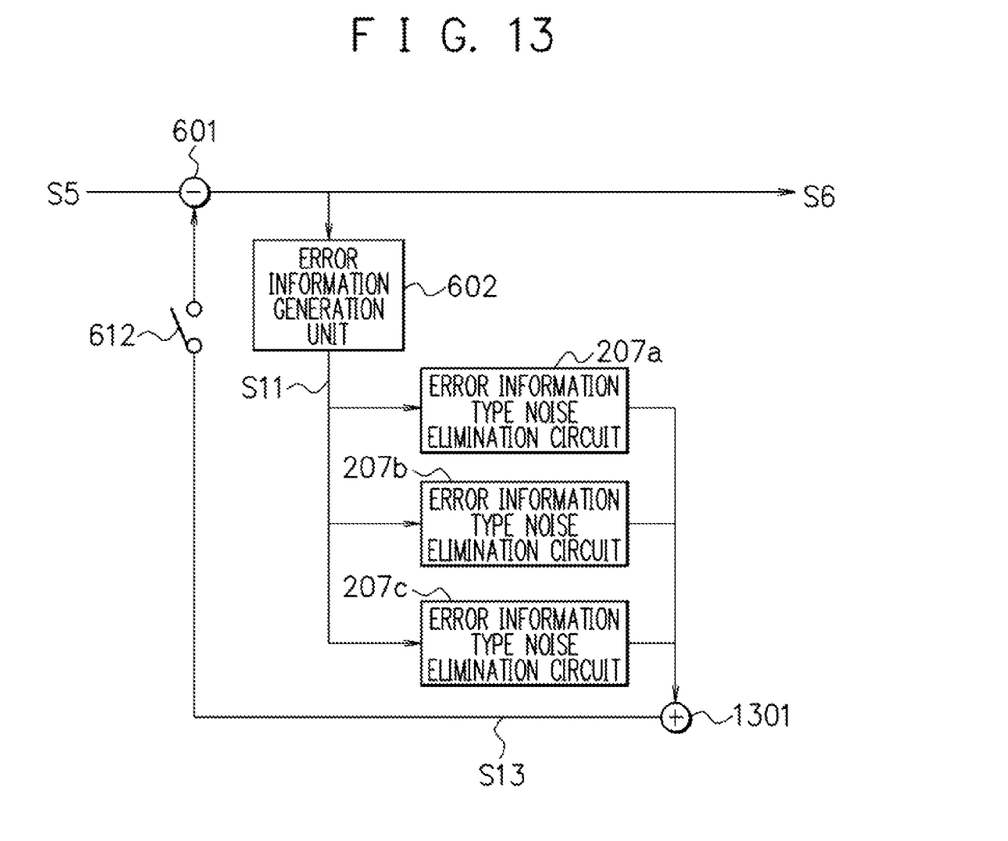
FIG. 13 is a view depicting a partial configuration example of a demodulation device according to a fourth embodiment.

FIG. 13 is a view depicting a partial configuration example of a demodulation device according to a fourth embodiment. The demodulation device in this embodiment is one in which three noise elimination circuits 207a to 207c are provided in the demodulation device in FIG. 2 in place of the first noise elimination circuit 207. The noise elimination circuits 207a to 207c each have the same configuration as that of the first noise elimination circuit 207 from which the first subtracter 601, the error information generation unit 602, and the switch 612 in FIG. 6 are eliminated. That is, the plurality of first noise elimination circuits 207a to 207c are connected in parallel at the subsequent stage of the demodulation unit 206 in this embodiment. Hereinafter, differences of this embodiment from the first embodiment are explained. In this embodiment, in the case when the three noises 102 different in frequency exist in the broadcast wave signal 101 in FIG. 1, the three noises 102 can be eliminated. It is possible to change the number of parallel connections of the first noise elimination circuits 207a to 207c.

Similarly to FIG. 6, the first subtracter 601 subtracts the signal S13 from the signal S5 to output the signal S6 from which the noises are eliminated. The error information generation unit 602 receives the signal S6 to output the error information S11.

The noise elimination circuit 207a, similarly to the first noise elimination circuit 207, receives the error information S11 to output a noise replica signal. The noise elimination circuit 207b, similarly to the first noise elimination circuit 207, receives the error information S11 to output a noise replica signal. The noise elimination circuit 207c, similarly to the first noise elimination circuit 207, receives the error information S11 to output a noise replica signal. An adder 1301 adds the noise replica signals output from the noise elimination circuits 207a to 207c to output the combined first noise replica signal S13. Similarly to FIG. 6, the first noise replica signal S13 is output to the first subtracter 601 via the switch 612.

The noise elimination circuits 207a to 207c are connected in parallel, and thereby only the single error information generation unit 602 is needed. However, in the case when the plurality of noise elimination circuits 207a to 207c operate simultaneously, there is a possibility that the plurality of noise elimination circuits 207a to 207c detect the noise existing at the same frequency, and thus amplitude adjustment of each of the noise elimination circuits 207a to 207c does not function well.

In order to solve the above problem, the plurality of noise elimination circuits 207a to 207c are not operated simultaneously but operated one by one in order, and operation start timing is controlled in such a manner that the single noise elimination circuit completes the noise elimination to then operate the following noise elimination circuit. That is, the plurality of noise elimination circuits 207a to 207c each have a noise elimination function turned on sequentially. Concretely, first, the single noise elimination circuit 207a is only operated. When the noise elimination circuit 207a completes the noise elimination, only the two noise elimination circuits 207a and 207b are operated. When the two noise elimination circuits 207a and 207b complete the noise elimination, the three noise elimination circuits 207a to 207c are operated. This makes it possible to eliminate the three noises different in frequency.

Providing the first noise elimination circuit makes it possible to eliminate the noise even in the case when the level of the noise in the input signal is small and to demodulate the input signal.

The present embodiments are to be considered in all respects as illustrative and no restrictive, and all changes which come within the meaning and range of equivalency of the claims are therefore intended to be embraced therein. The invention may be embodied in other specific forms without departing from the spirit or essential characteristics thereof.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has (have) been described in detail, it should be understood that the various changes, substitutions, and alterations could be made hereto without departing from the spirit and scope of the invention.

What is claimed is:

1. A demodulation device comprising:
 a demodulation unit demodulating an input signal to thereby output a signal of IQ coordinates; and
 a first noise elimination circuit eliminating a noise in the signal of the IQ coordinates that is output from the demodulation unit, wherein
 the first noise elimination circuit comprises:
 a first subtracter subtracting a first noise replica signal from the signal of the IQ coordinates that is output from the demodulation unit;
 an error information generation unit calculating error information of an output signal of the first subtracter to an ideal signal point of the IQ coordinates;
 a first frequency detection unit detecting a frequency of the noise based on the error information; and
 a first amplitude adjusting unit adjusting an amplitude of the first noise replica signal based on the error information and the frequency of the noise detected in the first frequency detection unit to output the first noise replica signal to the first subtracter.

2. The demodulation device according to claim 1, further comprising:
 a second noise elimination circuit eliminating a noise in an input signal to the second noise elimination circuit to output a signal from which the noise is eliminated to the demodulation unit, wherein
 the second noise elimination circuit comprises:
 a second subtracter subtracting a second noise replica signal from the input signal to the second noise elimination circuit;
 a second frequency detection unit detecting a frequency of the noise based on the input signal to the second noise elimination circuit; and
 a second amplitude adjusting unit adjusting an amplitude of the second noise replica signal based on an output signal of the second subtracter and the frequency of the noise detected in the second frequency detection unit to output the second noise replica signal to the second subtracter.

3. The demodulation device according to claim 2, wherein the demodulation unit outputs a pull-in completion notification when the noise in the signal output from the second noise elimination circuit becomes smaller than a threshold value, and
 the second noise elimination circuit comprises a gain adjusting unit that changes a level of the second noise replica signal to zero when the pull-in completion notification is input from the demodulation unit.

4. The demodulation device according to claim 3, wherein the gain adjusting unit gradually changes the level of the second noise replica signal to zero.

5. The demodulation device according to claim 3, wherein after the demodulation unit outputs the pull-in completion notification, the first frequency detection unit in the first noise elimination circuit detects the frequency of the noise in the signal of the IQ coordinates according to the frequency detected in the second frequency detection unit in the second noise elimination circuit.

6. The demodulation device according to claim 5, wherein
after the demodulation unit outputs the pull-in completion notification, the first frequency detection unit in the first noise elimination circuit detects the frequency of the noise in the signal of the IQ coordinates according to the frequency detected in the second frequency detection unit in the second noise elimination circuit when the level of the second noise replica signal of the second noise elimination circuit is larger than a threshold value.

7. The demodulation device according to claim 2, wherein
the demodulation unit outputs the pull-in completion notification when the noise in the signal output from the second noise elimination circuit becomes smaller than the threshold value,
after the demodulation unit outputs the pull-in completion notification, the first noise elimination circuit turns a noise elimination function off in the case when a level of the first noise replica signal is smaller than a first threshold value, and
after the demodulation unit outputs the pull-in completion notification, the second noise elimination circuit turns a noise elimination function off in the case when the level of the second noise replica signal is smaller than a second threshold value.

8. The demodulation device according to claim 7, wherein
after the demodulation unit outputs the pull-in completion notification, the first noise elimination circuit turns the noise elimination function on in the case when the level of the first noise replica signal is larger than the first threshold value, and
after the demodulation unit outputs the pull-in completion notification, the second noise elimination circuit turns the noise elimination function on in the case when the level of the second noise replica signal is larger than the second threshold value.

9. The demodulation device according to claim 2, wherein
a plurality of the second noise elimination circuits are connected in series at the preceding stage of the demodulation unit; and
only one of the second noise elimination circuits provides a signal to the demodulation unit.

10. The demodulation device according to claim 1, wherein
a plurality of the first noise elimination circuits are connected in parallel at the subsequent stage of the demodulation unit, and the plurality of first noise elimination circuits each have a noise elimination function turned on sequentially.

* * * * *